United States Patent [19]

Perlman

[11] Patent Number: 5,400,333
[45] Date of Patent: Mar. 21, 1995

[54] DETECTING LAN NUMBER MISCONFIGURATION

[75] Inventor: Radia J. Perlman, Acton, Mass.

[73] Assignee: Digital Equipment Corporation, Maynard, Mass.

[21] Appl. No.: 147,918

[22] Filed: Nov. 4, 1993

Related U.S. Application Data

[63] Continuation of Ser. No. 864,631, Apr. 7, 1992, abandoned.

[51] Int. Cl.$^6$ ............................................. H04L 12/46
[52] U.S. Cl. .............................. 370/85.13; 370/85.14; 370/94.1
[58] Field of Search ............... 370/85.11, 85.13, 85.14, 370/13, 17, 94.1, 94.2

[56] References Cited

U.S. PATENT DOCUMENTS

| Re. 33,426 | 11/1990 | Sugimoto et al. | 370/85.14 |
|---|---|---|---|
| 4,706,080 | 11/1987 | Sincoskie | 340/825.02 |
| 4,706,081 | 11/1987 | Hart et al. | 370/85.13 |
| 4,718,005 | 1/1988 | Feigenbaum et al. | 370/94.1 |
| 4,727,592 | 2/1988 | Okada et al. | 455/601 |
| 4,811,337 | 3/1989 | Hart | 370/85 |
| 4,933,938 | 1/1990 | Sheehy | 370/85.13 |
| 4,972,409 | 11/1990 | Backes | 370/85.13 |
| 5,016,244 | 5/1991 | Massey, Jr. et al. | 370/16 |
| 5,018,133 | 5/1991 | Tsukakoshi et al. | 370/16 |
| 5,018,137 | 5/1991 | Backes et al. | 370/85.13 |
| 5,027,350 | 6/1991 | Marshall | 370/85.13 |
| 5,038,340 | 8/1991 | Ochiai | 370/17 |
| 5,060,228 | 10/1991 | Tsutsui et al. | 370/85.13 |
| 5,150,360 | 9/1992 | Perlman et al. | 370/94.3 |
| 5,214,646 | 5/1993 | Yacoby | 370/85.14 |
| 5,239,537 | 8/1993 | Sakauchi | 370/16 |

OTHER PUBLICATIONS

Barri, "Distributed Connection Control and Maintenance For An ATM Multistage Interconnection Network", IEEE, CH2984–Mar. 1991, pp. 0692–0698.

IEEE Proposed Standard 802.5M/D6, entitled "Source Routing Transparent Bridge Operation", available from the *IEEE Service Center*, 445 Hoes Lane, P.O. Box 1331, Piscataway, N.J. 08855–1331.

IEEE Standard 802.1d, entitled "IEEE Standards for Local and Metropolitan Area Networks Media Access Control (MAC) Bridges", available from the *IEEE Service Center*.

OSI Intermediate System to Intermediate System protocol, documented in ISO Internation Standard 10589, available from *BSi Standards*, 2 Park Street, London W1A 2BS, England.

Primary Examiner—Wellington Chin
Attorney, Agent, or Firm—Fish & Richardson

[57] ABSTRACT

Methods and apparatus for verifying—in a network comprised of LANs and bridges connected to LANs, in which the bridges associate the LANs with LAN numbers—that bridges connected to a given LAN have been configured with the same LAN number for that LAN. A first bridge encodes the LAN number configured for the given LAN into a LAN number verification message and transmits the message to a second bridge connected to the LAN. The second bridge then compares the LAN number encoded in the received LAN number verification message to the LAN number configured for the LAN at the second bridge. A bridge which performs this method includes storage for associating the LANs connected to the bridge with LAN numbers, an encoder for encoding the LAN number for a given LAN into a LAN number verification message, and a transmitter for transmitting the LAN number verification message onto the given LAN.

7 Claims, 14 Drawing Sheets

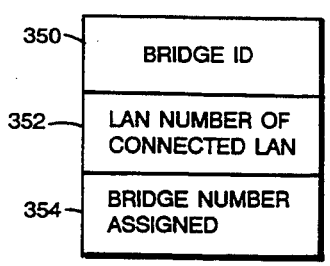
FIG. 8A
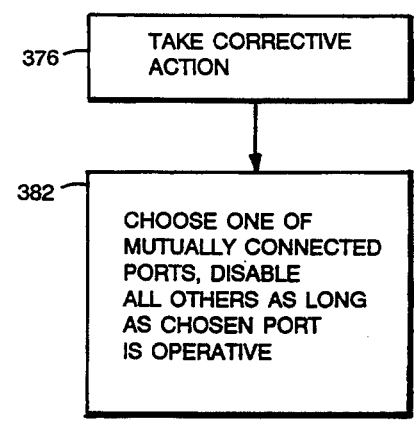
FIG. 8B
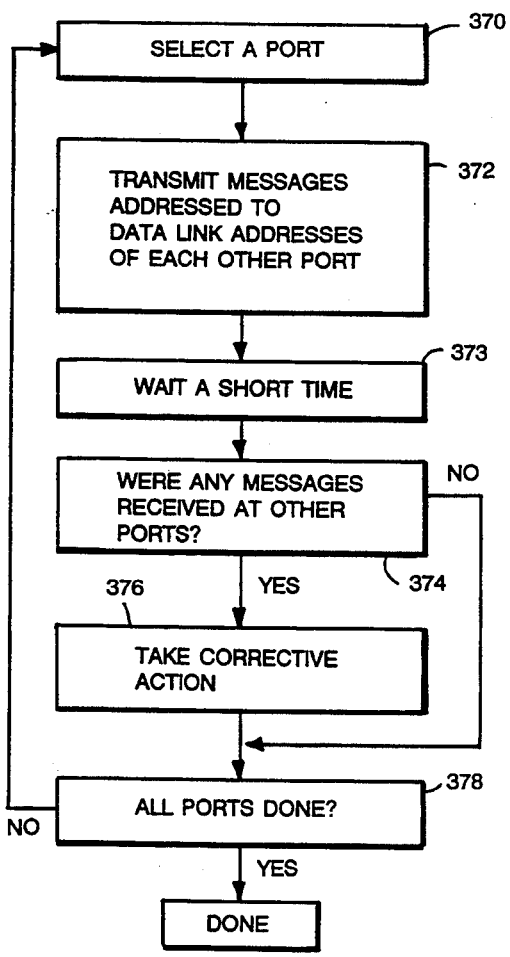
FIG. 9A
FIG. 9C
FIG. 9B

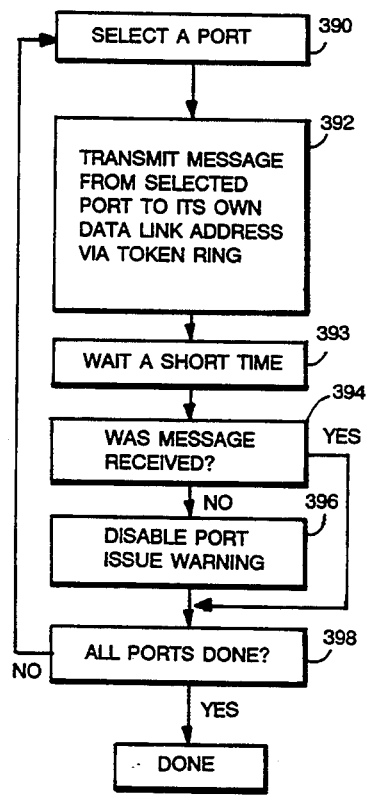
FIG. 9D
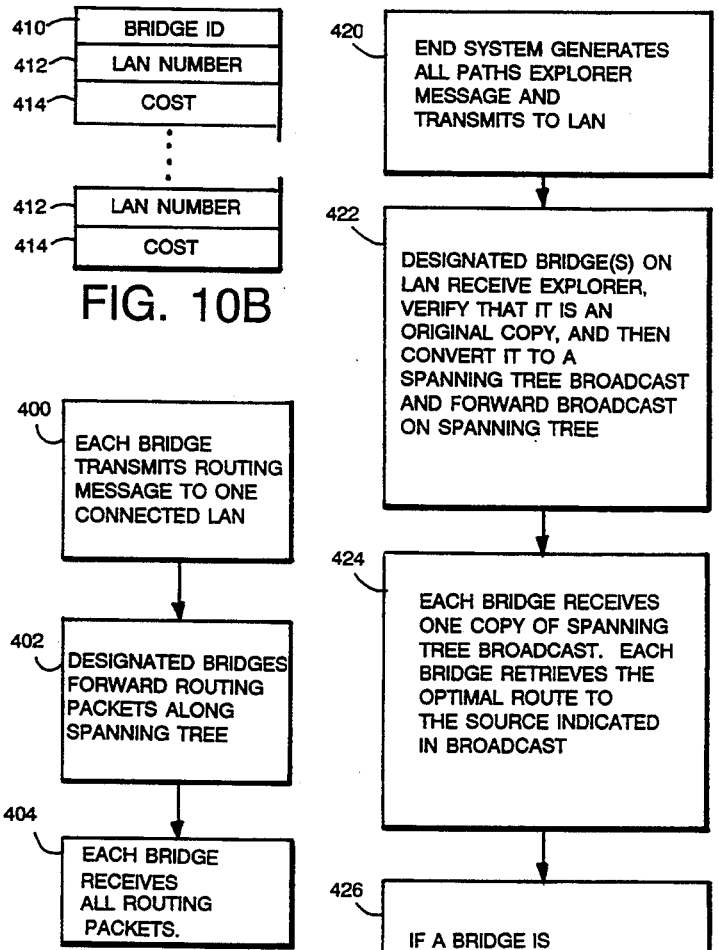
FIG. 10A
FIG. 10B
FIG. 10C
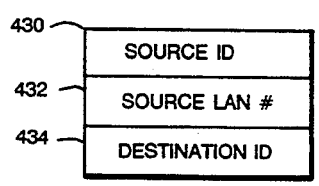
FIG. 10D

1

DETECTING LAN NUMBER MISCONFIGURATION

CROSS REFERENCE TO RELATED APPLICATIONS

This is a continuation of application Ser. No. 07/864,631, field Apr. 7, 1992, now abandoned.

This application is related to co-pending application Ser. No. 07/864,572, entitled SELECTING OPTIMAL ROUTES IN SOURCE ROUTING BRIDGING WITHOUT EXPONENTIAL FLOODING OF EXPLORER PACKETS, and application Ser. No. 07/864,685, entitled AUTOMATICALLY CONFIGURING LAN NUMBERS, and application Ser. No. 07/864,846, entitled AUTOMATICALLY CONFIGURING PARALLEL BRIDGE NUMBERS, and application Ser. No. 07/872,821, entitled ASSIGNING MULTIPLE PARALLEL BRIDGE NUMBERS TO BRIDGES HAVING THREE OR MORE PORTS, all filed by Radia J. Perlman on the same date as this application.

BACKGROUND OF THE INVENTION

Background of the Invention

This application relates to networks composed of local area networks (LANs) connected by LAN bridges.

A LAN is a network of computing systems (generally referred to as end systems) which are connected by a common communications medium, or bus. Messages are transferred from one end system to another via the LAN by conveying the message, along with the address of the intended recipient end system, onto the common communications bus. Each end system then receives the message and reads the address. If the message address matches the recipient end system's address, the message is processed; otherwise, the message is discarded. Thus, in a LAN, every message is received by every end system; this allows for simple interconnection and rapid communication, but limits the number of end systems that can be effectively interconnected.

When the number of end systems on a LAN becomes unmanageable, or when geographical restrictions prohibit serviceable connection of all end systems on a single LAN, system managers typically organize groups of end systems into several LANs, and use bridges to provide connections between the LANs, forming a LAN/bridge network.

SUMMARY OF THE INVENTION

In one aspect, the invention features a method of verifying—in a network comprised of LANs and bridges connected to LANs, in which the bridges associate the LANs with LAN numbers—that bridges connected to a given LAN have been configured with the same LAN number for that LAN. A first bridge encodes the LAN number configured for the given LAN into a LAN number verification message and transmits the message to a second bridge connected to the LAN. The second bridge then compares the LAN number encoded in the received LAN number verification message to the LAN number configured for the LAN at the second bridge.

Preferred embodiments of this aspect include the following features:

If the second bridge locates a mismatch between the encoded and configured LAN numbers, it reports the mismatch to system administration by transmitting a message, or by a visual or audible signal.

The LAN number verification message is formatted as a multicast message addressed to a multicast address which is not being used by the end systems on the LAN, or is included in a modified version of the configuration messages used by the bridges to generate a spanning tree for the network.

In another aspect, the invention features a bridge which can determine whether other bridges connected to the same LAN(s) have been configured with the same LAN numbers for those LANs. The bridge includes storage for associating the LANs connected to the bridge with LAN numbers, an encoder for encoding the LAN number for a given LAN into a LAN number verification message, and a transmitter for transmitting the LAN number verification message onto the given LAN.

In preferred embodiments, the bridge further includes a receiver for receiving LAN number verification messages, and a comparer for comparing the LAN number encoded in the received LAN number verification message to the LAN number configured for the LAN in the bridge's storage.

BRIEF DESCRIPTION OF THE DRAWINGS

FIG. 8A illustrates a request/refresh message transmitted to and from designated bridges while automatically assigning parallel bridge numbers.

FIG. 8B illustrates a database maintained by designated bridges.

FIG. 9A illustrates a procedure used to determine if two ports of a 3+-port bridge are connected to the same LAN.

FIGS. 9B and 9C illustrate corrective actions to be taken if two ports of a 3+-port bridge are connected to the same LAN.

FIG. 9D illustrates a procedure for verifying the operation of a port connected to a token ring LAN.

FIG. 10A illustrates a procedure for sharing routing messages as part of a scheme to locate routes through the network without exponential proliferation of explorer messages.

FIG. 10B illustrates the routing message used in the procedure of FIG. 10A.

FIG. 10C illustrates a procedure for locating a route using the routing information collected by the procedure of FIG. 10A.

FIG. 10D illustrates the routing broadcast message used in the procedure of FIG. 10C.

DESCRIPTION

Figure 1:
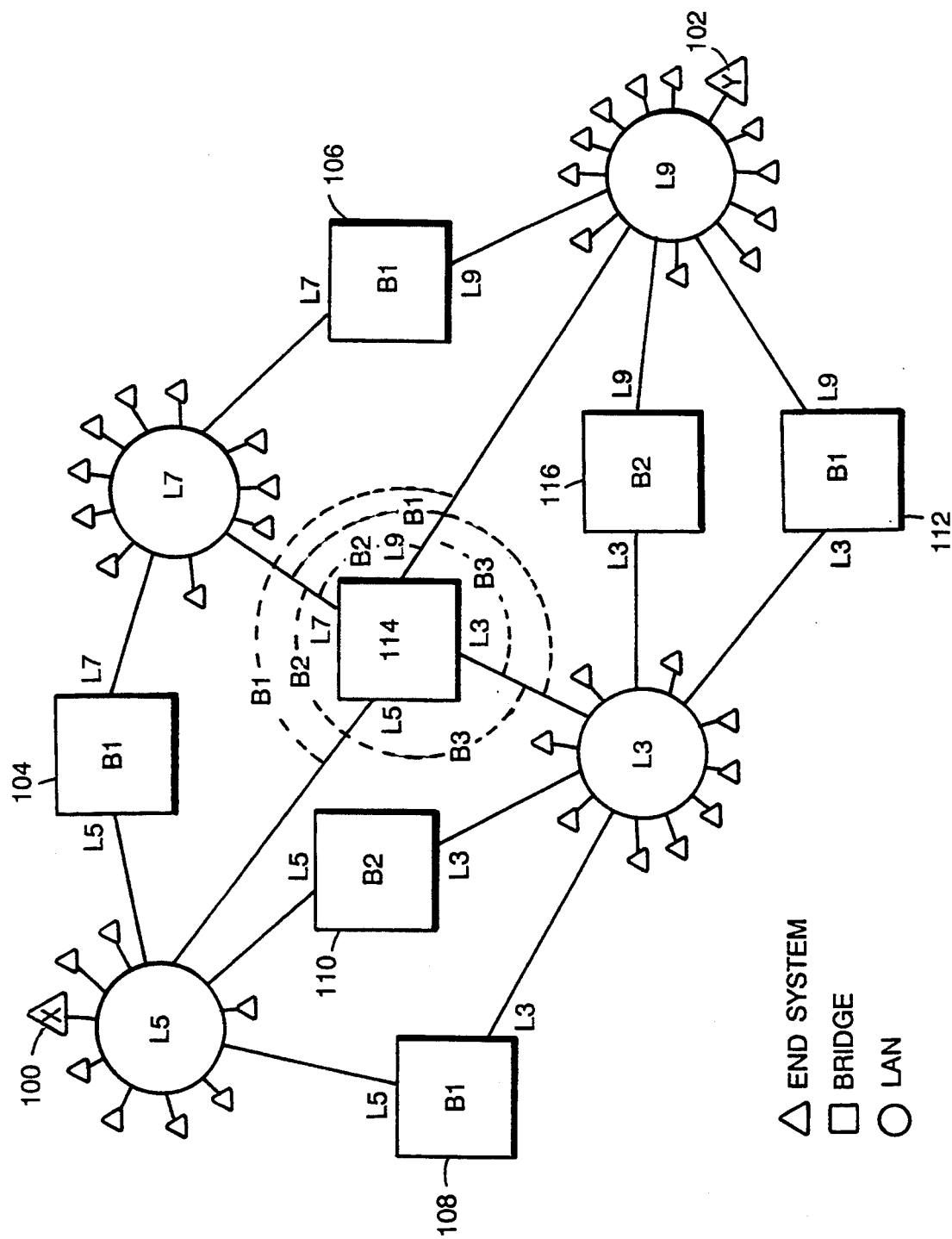
FIG. 1 illustrates a LAN/bridge network.

A LAN/bridge network is illustrated in FIG. 1; LANs are illustrated by rings, bridges by squares, and end systems by triangles.

Several issues arise in an architecture of this type. First, the bridges cannot be allowed simply to copy each message received on one LAN to the other connected LAN; this strategy would cause message looping if there were any loops in the topology, and, even if a loop-free topology were used, the result would be inefficient. For this reason, it is necessary to provide for routing of messages to specific LANs. In known LAN/bridge networks, this is done by assigning each LAN a "LAN number". As illustrated in FIG. 1 the LAN numbers (e.g., , "L5" "L9") may be assigned arbitrarily and are valid as long as two LANs do not have the same number. While four LANs are illustrated in FIG. 1, the number of LANs in a LAN/bridge network of this type is only limited by the number of possible LAN number values; typically, the LAN numbers are 12 bits, allowing 4096 LANs to be interconnected in a LAN/Bridge network.

Ordinarily, to send a message from a transmitting end system to a receiving end system on the same LAN, a header is attached to the message indicating the address of the source end system and the destination end system. Thus, for example, a message transmitted from a source end system having an address X to a destination end system having an address Y has a header:

Y|X.

Each end system on the LAN, upon receiving this message, determines if its address is Y, and if so, the end system reads the message.

In a LAN/bridge network, the addressing is more complex. To send a message from a transmitting end system on a first LAN to a receiving end system on a second LAN, the sequence of LAN numbers that should be traversed to reach the second LAN is appended to the message. For example, if end system 100 has address X, and end system 102 has address Y, a message to be transmitted from end system 100 to end system 102 would contain a header with the sequence:

Y|X|L5|L3|L9 or, alternatively, the message might contain the sequence:

Y|X|L5|L7|L9, either of which indicates a path from end system 102 to end system 100 (i.e., from LAN L5 to LAN L7 or LAN L3, and then to LAN L9). Schemes which use this technique are known as "source routing bridging" schemes, and the messages containing such a sequence are known as "source routed" messages. (Further detail on one source routing bridging scheme can be found in IEEE Proposed Standard 802.5M/D6, entitled "Source Routing Transparent Bridge Operation", available from the IEEE Service Center, 445 Hoes Lane, P.O. Box 1331, Piscataway, N.J. 08855-1331, and incorporated herein by reference.)

Source routed messages are forwarded by the bridges from one LAN to the next by referring to the LAN numbers contained within the message header. To accomplish this, each bridge is manually configured with the numbers of the LANs connected on each side. Thus, bridge 104, which connects LANs 55 and L7, associates these LAN numbers with the links that connect the bridge to the respective LANs (this is illustrated by the indicators L5 and L7 which appear next to the links connecting bridge 104 to LANs L5 and L7). Using these stored LAN numbers, the bridges can determine whether they should forward a source routed message to a connected LAN. For example, when a message containing the sequence described above:

Y|X|L5|L7|L9 is received by bridge 104, the bridge reads the sequence to find the number of the LAN from which message was received (L5); then, it reads the next LAN in the prescribed path (L7) and checks if it is capable of forwarding the packet onto LAN L7. Since bridge 104 connects LAN L5 to LAN L7, it forwards the packet to LAN L7. By the same procedure, bridge 106 forwards the message onto LAN L9. Thus, the message appears on LAN L9 and is received by end system 102.

One complication which the above description does not handle is the possibility of parallel bridges connecting two LANs. Often it is desirable to increase the capacity or reliability of a network by placing multiple bridges between two LANs; for example, bridges 108 and 110 both connect LAN L5 to LAN L3. Under the scheme described above, when bridges 108 and 110 receive a source routed message such as that described above:

Y|X|L5|L3|L9 both would transmit the message from LAN L5 to LAN L3. As a result, two copies of the message will be forwarded.

To avoid this possibility, typical LAN/bridge networks also apply "parallel bridge numbers" to each bridge of a set of parallel bridges that connect two LANs. For example, bridges 108 and 110 have been assigned parallel bridge numbers B1 and B2, respectively. As with LAN numbers, parallel bridge numbers are manually configured and can be assigned arbitrarily. The numbers are valid as long as no two bridges between a given pair of LANs have the same parallel bridge numbers. The number of parallel bridges is only limited by the number of possible parallel bridge number values; typically, a 4 bit field is used, allowing 16 parallel bridges to be connected between any two networks.

Once bridge numbers have been established, duplication of messages can be avoided by including the desired parallel bridge number in the source routing sequence in each message. Thus, the packet discussed in the prior example is enhanced by indicating the desired parallel bridges along with the LANs along the route:

Y|X|L5|B2|L3|B1|L9 thus indicating that the packet is to travel from LAN L5 to B2) LAN L3 via bridge 110 (which has parallel bridge number and then to LAN L9 via bridge 112 (which has parallel bridge number B1).

There are bridges which have more than two ports and thus can connect more than two LANs. Bridge 112 is an example of a 4-port bridge. Because 3+-port bridges make several different connections between two or more LANs, it is necessary to assign a parallel bridge number to each connection established by the 3+-port bridge. One way to deal with this situation is to assign a single number to the 3+-port bridge, so that the same parallel bridge number is assigned to every connection made by the 3+-port bridge. Although this scheme simplifies configuration, because there are a limited number of parallel bridge numbers that can be assigned, this scheme constrains the topology of the network, and thus forces the system administrator to carefully consider the bridge number assignments to minimize these constraints.

An alternative scheme is to treat each 3+-port bridge as if it contained an internal LAN; the 3+-port bridge is assigned a LAN number and packets are routed through it as if it were an actual LAN. Although this scheme eliminates the problem of assigning parallel bridge numbers to the 3+-port bridge (since the connections made by the 3+-port bridge are no longer parallel to those made by other bridges), it has the difficulty that the connections made through the 3+-port bridge are treated in the same manner as connections made through a LAN, thereby increasing the apparent number of LANs traversed by a packet along a route. As will be elaborated below, this can constrain the topology because, typically, there are limits on the number of LANs a source routed packet can traverse along its route.

FIG. 1 illustrates a third, preferred scheme. In this scheme, 3+-port bridges are treated as a collection of two-port bridges, one for each connection made by the 3+-port bridge. Thus, each pair of connections made by the 3+-port bridge is assigned a different parallel bridge number. Thus, bridge 114 is assigned parallel bridge number B3 for the connection that it makes between LANs L5 and L3, but it is assigned parallel bridge number B2 for the connection that it makes between LANs L5 and L7. In all, bridge 114 connects 6 different pairs of LANs and thus is equivalent to 6 single bridges, and therefore is assigned 6 parallel bridge numbers, one for each connection. (An n-port bridge will make $(n^2-n)/2$ connections and thus will need to store this many parallel bridge numbers.)

While the above describes the typical mechanism for routing packets in a LAN/bridge network, it does not explain how the routes are determined. This is typically accomplished by means of "explorer" messages. When an end system seeks to locate a route to another end system which is not on the same LAN, it originates an explorer message indicating the address of the desired destination, and then transmits the explorer message on the LAN. Through a procedure described below, copies of the explorer message are propagated through all of the bridges and LANs in the network, exploring every possible route through the network and collecting information about the paths followed. The explorers may also accumulate other data, such as the maximum packet size along the path followed or the "cost" (expediency) of those paths. Eventually, multiple copies of the explorer packet reach the destination end system, and the destination end system is able to compare the various paths that were found, and choose the most expedient route (e.g., by selecting the route which passed through the least number of LANs, or the route with the lowest "cost"). Then, the destination end system stores this route for use in future communications with the source end system, and transmits an acknowledgement message containing the route to the source end system. Once the acknowledgement is received by the source end system, communications can begin using the source routing scheme described above.

Figure 2:
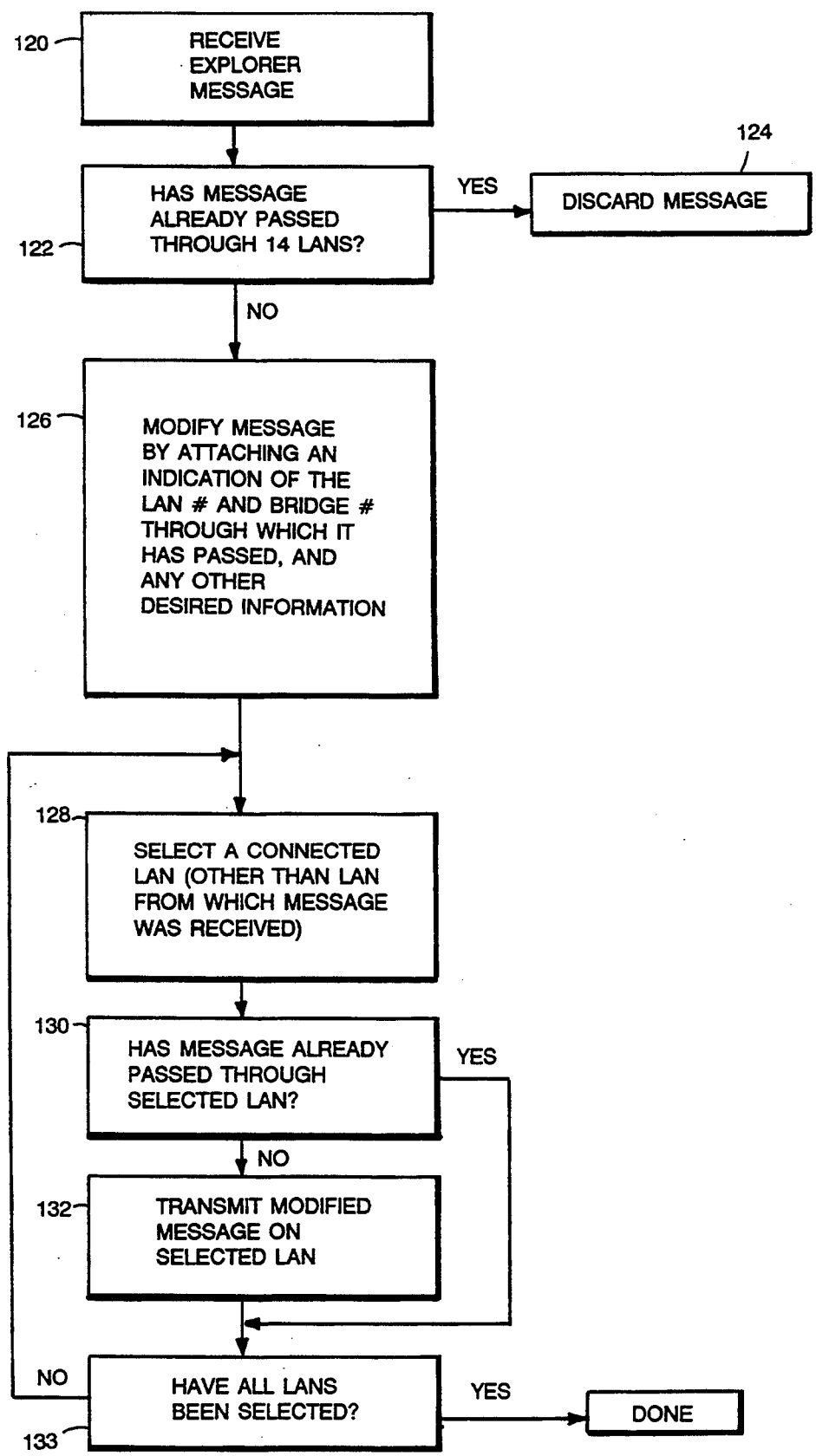
FIG. 2 illustrates a procedure for forwarding all paths explorer messages.

Explorer messages are subject to a special procedure when received by bridges. As shown in FIG. 2, when a bridge receives 120 an explorer message, the bridge modifies 126 the message by attaching an indication of the LAN number and bridge number through which the message has passed, as well as any other desired information (e.g., the maximum packet size of the links through which the packet has passed, or the cost of travelling through those links), and then forwards 132 the modified version to all connected LANs (except the LAN from which the packet was received).

Various protections are typically used to prevent endless looping of explorer messages in the network; for example, before forwarding explorer messages onto a LAN the forwarding bridge scans the message to determine 130 whether the explorer message has already been through the LAN; if so, the explorer message is not sent on that LAN and another LAN is selected 128. Also, a bridge checks 122 if the explorer message has already visited more than a pre-set maximum number of LANs (e.g., 14 LANs), and if so, it discards 124 the message altogether.

Often it is useful to simultaneously transmit a message to a group of end systems. In a LAN, this is done by establishing special "multicast" addresses; messages addressed to a multicast address can be received by any end system configured to received messages from ("listen to") that address. While this solution is workable in a single LAN (because every message is available to every end system), to make it work in a multi-LAN network connected by bridges, it is necessary to establish a procedure for propagating a single copy of a message to every LAN in the network. (Although the technique used for explorer messages propagates the explorer message to every LAN, multiple copies are received by each LAN, which is unacceptable in this context.)

To allow multicasts, LAN/bridge networks typically run a "spanning tree" algorithm. Details on this algorithm can be found in IEEE Standard 802.1d, entitled "IEEE Standards for Local and Metropolitan Area Networks Media Access Control (MAC) Bridges", available from the IEEE Service Center at the address given above, and incorporated herein by reference. Under this algorithm, one bridge is elected to be the "root" using an election algorithm that determines which bridge has the highest "priority". The root then transmits a "configuration message" to each of the LANs to which it is connected. The configuration message then propagates through the network following an algorithm (described below) which locates the lowest cost route from the root bridge to each LAN in the network. This process selects a set of "designated bridges", which are those bridges in the network which form part of the lowest cost route from the root bridge to one or more of the LANs. For example, in FIG. 1, if the root bridge is bridge 110, the designated bridges may be bridge 110 (as part of the lowest-cost path to LANs L5 and L3), bridge 104 (e.g., as part of the lowest-cost path to LAN L7—via LAN L5), and bridge 114 (e.g., as part of the lowest-cost path to LAN L9—via LAN L5).

As mentioned above, the root bridge is always designated, and a 3+-port bridge such as bridge 114 may be a designated bridge, but will only be designated for specific pairs of input and output links. Also, a given LAN may have one or more designated bridges connected to it; one which leads toward the root bridge, and zero or more which lead toward other LANs that are further from the root bridge than the given LAN. Since, for a given LAN, only one designated bridge leads toward the root bridge, this bridge is often referred to as the "designated bridge for" the given LAN. Thus, in the preceding example, bridge 110 is the designated bridge for LANs L5 and L3, bridge 104 is the designated bridge for LAN LT, and bridge 114 is the designated bridge for LAN L9.

The designated bridges effect a multicast as follows: Whenever a designated bridge receives a message addressed to a multicast address on either of the two LANs which it connects, it automatically transmits a copy of the message to the other of the two LANs. In this way, a multicast message which is originated anywhere in the LAN/bridge network is propagated to each LAN in the remainder of the network. In the above example, a multicast message on LAN L9 will be copied by bridge 114 to LAN L5, and from there by bridges 104 and 110 to LANs L7 and L3.

Figure 3:
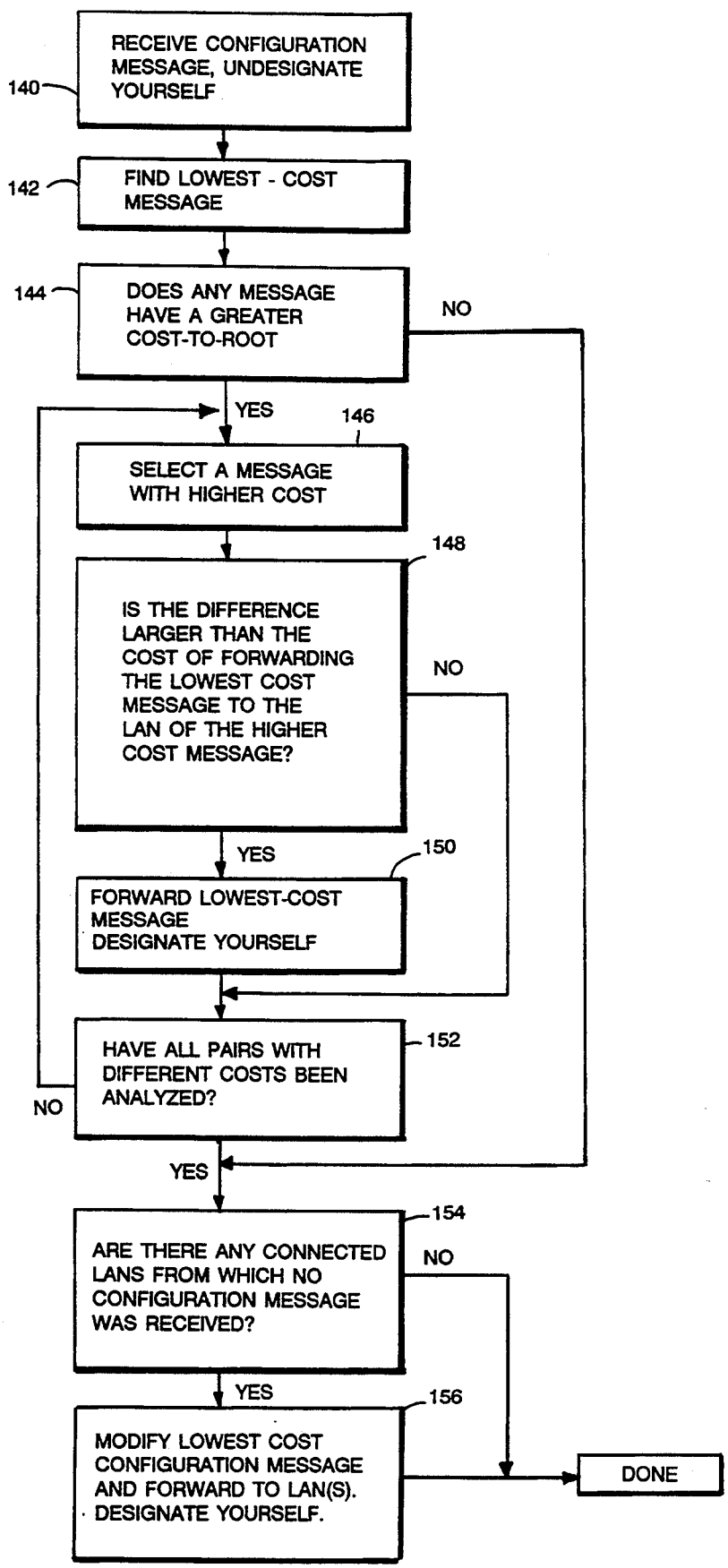
FIG. 3 illustrates a procedure for receiving configuration messages and generating a spanning tree.

The general form of an algorithm for finding designated bridges is illustrated in FIG. 3. Each configuration message indicates the cost of the path taken by the message from the root bridge (the "cost-to-root"). When a bridge receives 140 a configuration message from an attached LAN, it assumes that it is no longer designated, and begins to analyze the message. First, the bridge compiles the new configuration message with previously-received configuration messages, and locates 142 the message with the lowest cost-to-root. The bridge then determines 144 whether there are any configuration messages with higher cost to the root than this lowest-cost message. If so, the bridge selects 146, 152 each higher cost message and determines 148 whether the difference in cost between the higher cost message and the lowest-cost message is greater than the cost of forwarding the lowest-cost message to the LAN from which the higher cost message was received. In this way, the bridge determines whether the path to that LAN through itself is lower cost than the path that was followed by the higher cost message. If so, the bridge has determined that it is a designated bridge (since it is on the lowest cost path to the LAN from which the higher cost message was received). In this case, the bridge modifies 150 the lowest-cost message to indicate the cost of forwarding the message through itself and onto the LAN from which the higher cost message was received, and then forwards the modified message to that LAN.

In addition to the above steps, each bridge determines 154 whether there are any connected LANs from which no configuration messages have been received. If there is such a LAN, then the bridge can immediately determine that it is a designated bridge, since the absence of any configuration messages from such a LAN indicates that no other paths to that LAN have been located. In this situation, the bridge modifies 156 the lowest-cost configuration message to indicate the cost of forwarding it to the LAN from which no messages was received, and then forwards the modified message to that LAN, thus promulgating the spanning tree algorithm into the new LAN.

With the above scheme, any changes in the topology will take a given amount of time to propagate throughout the network. During the settling period, there may be inconsistencies in the designations of the bridges. For this reason, typically a new designated bridge waits for a fixed period of time, e.g. 30 seconds, before beginning to forward multicast messages, thus allowing time for the network to settle after a topology change and minimizing the potential for loops. For extra security, the bridges which become undesignated immediately stop forwarding multicast messages.

One significant difficulty with source routing schemes is reliance on manual configuration. For example, a technician must manually configure the LAN numbers and parallel bridge numbers at each of the individual bridges. Reconfiguring such a system requires, as a practical matter, that a technician physically trace the wires which connect the ports on each bridge to the other connections on the various end systems and bridges which form the LAN. This task can be arduous, particularly in a typical computer network comprised of several rooms full of cables, several of which pass through walls and floors before reaching their destination. Not only is a high level of effort required, but the risk of human error is severe. And, even if the configuration is performed correctly, changes in the network (e.g., dynamic merging of LANs or addition of new bridges), may create a LAN number mismatch and will require reconfiguration.

The consequences of erroneous configuration are severe: in the worst case, messages may circle through the network endlessly since there is no "hop count" or "lifetime" mechanism for eliminating them. Even if this does not happen, the misconfigured bridge will be useless for source routing because it will be unable to forward source routed packets correctly.

Perhaps most problematic is the fact that there is no way, other than by noticing an unusual number of lost packets or an inexplicable drain on network resources, to determine whether the configuration has been done correctly.

Figure 4A:
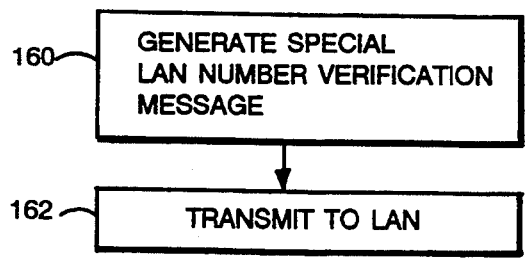
FIGS. 4A and 4B illustrate procedures for locating LAN number misconfiguration.
Figure 4B:
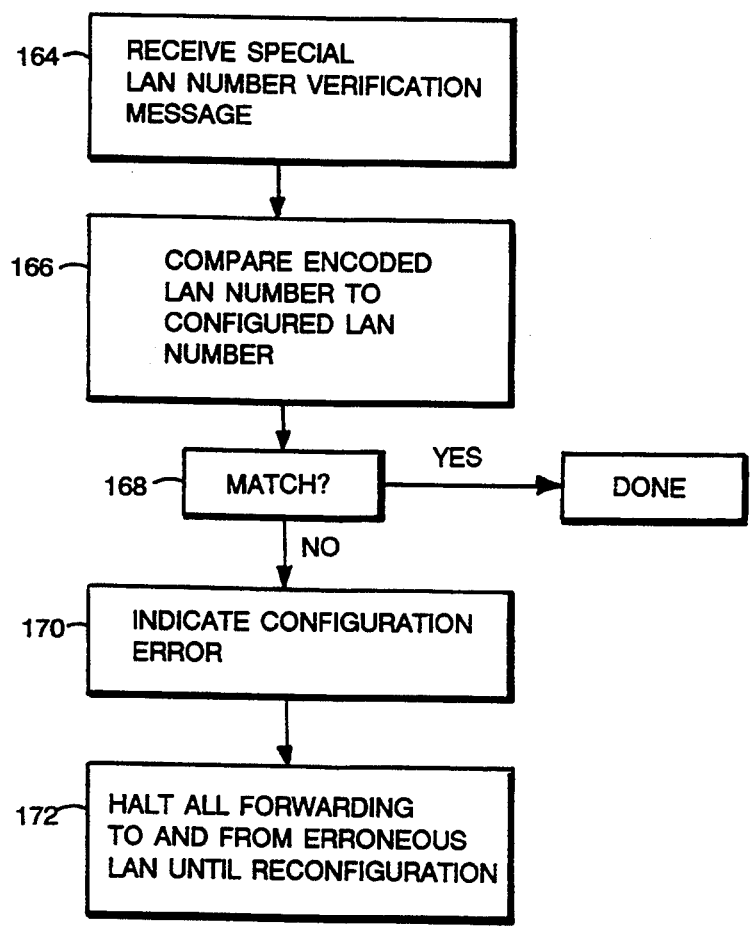

As illustrated in FIGS. 4A and 4B, it is possible to avoid the problems associated with LAN number misconfiguration by designing the bridges to automatically check that the same LAN numbers are being used by each bridge attached to the network.

Referring to FIG. 4A, periodically one or more bridges on a given LAN generate 160 a LAN number verification message and transmit 162 the message onto the given LAN. The LAN number for the given LAN is encoded into the LAN number verification message.

The LAN number verification message may take the form of a multicast message addressed to a "unique" multicast address, i.e., a multicast address which is not being used by any of the end systems on the LAN. Alternatively, the verification message may be of a type that is not ordinarily recognized by the bridges and end systems. A third alternative is to append an additional field onto the configuration messages described above. The third alternative has the advantage that bridges are already typically designed to periodically transmit configuration messages for the purpose of maintaining the spanning tree.

Only one bridge on each LAN need transmit this message for verification to be performed (but two or more of the bridges may transmit the messages if desired). The bridge which transmits the message can be selected under any suitable scheme: for example by using the unique numerical IDs assigned to bridges by manufacturers; the bridge with the numerically highest or lowest ID can be selected. (To perform the selection, the bridges can be designed to periodically hold an "election": each bridge transmits its ID to the other bridges via the LAN—e.g., via messages addressed to a unique multicast address, or of an ordinarily unrecognized type—and then each bridge compares its own ID to those of the others; the bridge with the numerically highest or lowest ID then commences transmission of LAN number verification messages.) Alternatively, the designated bridge for the LAN (which is already selected by the spanning tree algorithm described above) can be selected to transmit the LAN number verification messages.

Referring to FIG. 4B, when a bridge receives 164 a LAN number verification message, it compares 166 the LAN number encoded in the message to the LAN number configured into the bridge for the LAN from which the message was received, and determines 168 if the numbers match. If the numbers don't match, then the bridge indicates 170 a configuration error, by making a visual and/or audible signal on its control panel, and/or by transmitting a message indicating the error to the system supervisor. As an additional safety precaution, the bridge can also halt 172 all forwarding of messages to and from the LAN where the error was discovered until the system supervisor resets the error condition after reconfiguration.

Figure 4C:
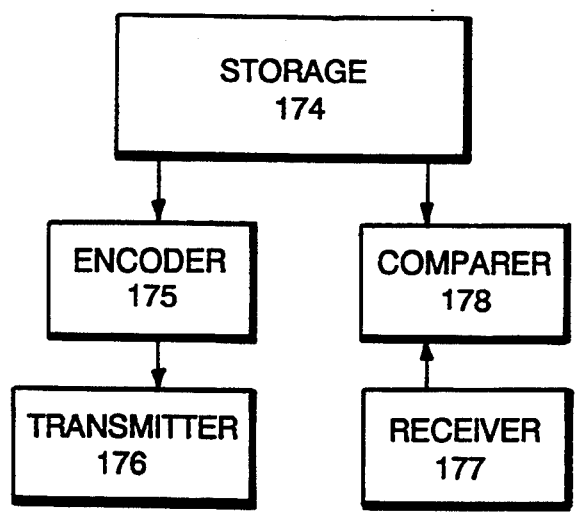
FIG. 4C is a block diagram of a bridge used in the disclosed scheme.

FIG. 4C is a block diagram of a bridge configured to use the above scheme. The LAN number storage 174 is accessed by an encoder 175 which encodes the LAN number configured for a LAN connected to the bridge into a LAN number verification message, which is then transmitted to the LAN by the transmitter 176. LAN number verification messages which are received by the receiver 177 are forwarded to a comparer 178 which compares the LAN number encoded in the verification message to the LAN number held in storage 174.

One advantage to the scheme described above is that it can be made reverse-compatible, that is, it can be designed to work properly even though the network contains pre-existing bridges that do not send or receive LAN number verification messages. To accomplish this, two conditions must be met, described below.

The first condition is that the LAN number verification messages (and, where applicable, the election messages) be ignored by all pre-existing end systems and bridges on the network. This can be achieved under any of the three approaches outlined above: if these messages use a unique multi-cast address or a data type which is not recognized by pre-existing end systems and bridges, they will be ignored by all of the end systems; alternatively, if the information is appended to the configuration messages in the proper manner, pre-existing bridges will ignore the additional information.

The second condition is that, if only one bridge transmits the LAN number verification messages, that bridge must be one of the new bridges. If one of the pre-existing bridges is selected to transmit the verification messages (e.g., under a scheme that selects the designated bridge), the verification messages will never be transmitted. Thus, the election of the transmitting bridge must be done in a manner that ensures selection of a new bridge; for example, the election may be based on the ID numbers as described above (the pre-existing bridges would not participate in such an election and thus could not be elected). Alternatively, the new bridges can be designed to select the designated bridge, but if no verification messages are forthcoming, to revert to an ID-based election scheme, or, more simply, to revert to a mode in which every new bridge transmits LAN number verification messages.

If both of the above conditions are met, a LAN containing some new bridges and some pre-existing bridges will be able to operate properly. The new bridges will share LAN number verification messages to verify among themselves that their configured LAN numbers are consistent. The pre-existing bridges will simply ignore the additional messages being exchanged by the new bridges. In this way, any inconsistencies in the configuration of the new bridges will be caught without disturbing the pre-existing bridges.

Although the preceding discussion describes a mechanism for locating misconfigured LAN numbers, it does not reduce the burden of manually configuring the LAN numbers. This issue is dealt with by the scheme described in FIGS. 5A through 6C.

Generally, this scheme designs the bridges so that information on LAN numbers is collected at a central point so that LAN numbers can be assigned in a consistent fashion. This central point can be, for example, the root bridge in the network spanning tree.

Because this scheme automatically assigns LAN numbers, it is possible for the number of a given LAN to change over time. Frequent changes reduce the efficiency of the network because changes invalidate source routes previously located with explorer packets, thus requiring end systems to issue new explorer packets to locate new routes using the changed LAN numbers. Thus, it is important to minimize changes, and this is one important goal of the assignment scheme described below.

Figures 6A, 6B, 6C:
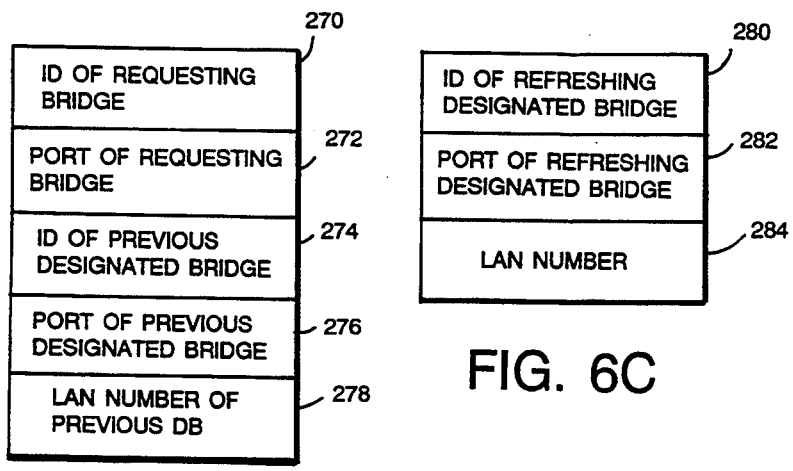
FIG. 6A illustrates the database maintained by the root bridge.
FIGS. 6B and 6C illustrate LAN number request and refresh messages.

As mentioned above, the LAN numbers may be assigned by the root bridge, in which case the root bridge maintains a database such as that illustrated in FIG. 6A. The database associates each LAN number 260 with the designated bridge 262 for the LAN, and the port 264 on the designated bridge which is connected to the LAN. The database also tracks the freshness of the entry by storing the time 266 at which it was refreshed (thus allowing for purges of old entries). Using this database, the root bridge can determine which LAN numbers are not being used, and can assign new numbers where needed.

The spanning tree of designated bridges is used to communicate the LAN numbers from the root bridge to the other bridges. After assigning the LAN numbers, the root bridge transmits these LAN numbers to the designated bridges, which then relay the LAN numbers to the other bridges.

As mentioned above, it is important that the LAN number assignments not change over time. To achieve this, when the designated bridge for a LAN changes, the new bridge requests a LAN number from the root bridge, including in the request (if known) the number that was being used by the LAN before the new bridge became designated and/or the identity of the bridge and port that were previously designated. Using this information, the root bridge can update its database, and more importantly, attempt to assign the same LAN number to the LAN that was being used by the previously designated bridge. Thus, even if the designated bridge for a LAN changes, the LAN number assigned to the LAN will typically remain the same.

Another possible source of change is a failure in the root bridge or a change in the identity of the root bridge, either of which will cause the root bridge to lose the database of previous LAN number assignments. According to the scheme described below, the effect of such an occurrence is minimized by programming the designated bridges to periodically send "refresh" messages to the root bridge; the refresh messages indicate the LAN numbers being used by the designated bridges for their respective LANs. Thus, if the root bridge loses its database, it can rebuild it from the refresh messages and thereby maintain the LAN numbers which are already assigned.

As discussed above, to communicate LAN numbers throughout the LAN, each designated bridge periodically transmits a LAN number identification message to the LAN for which it is designated; the message indicates the assigned LAN number for that LAN, as well as the ID of the designated bridge and the port of that designated bridge that is connected to the LAN. One efficient way to communicate this information is to add one or more additional fields (in the manner discussed above) to the configuration messages described above. These messages are already shared by the designated bridges on a periodic basis, and typically already contain at least the ID of the transmitting bridge. Alternative implementations can use a new message type or an unused multicast address.

Figures 5A, 5B, 5C:
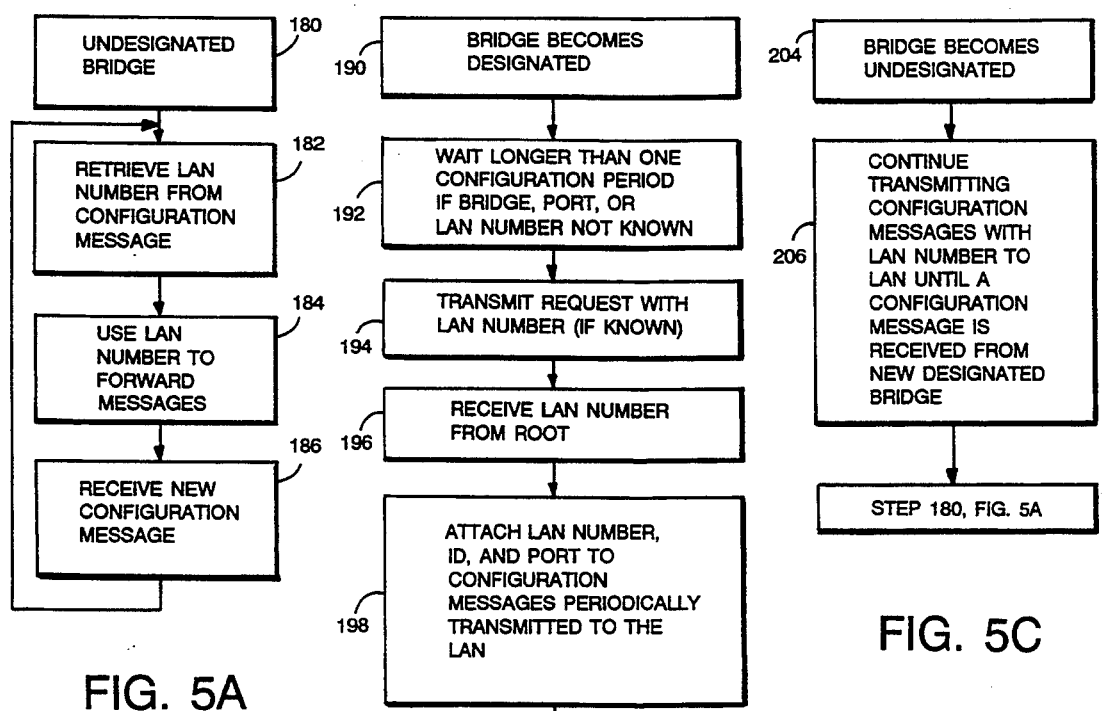
FIGS. 5A through 5C illustrate procedures followed by a designated bridge as part of a scheme for automatically assigning LAN numbers.

Each bridge which is not designated responds to the configuration messages according to the procedure illustrated in FIG. 5A. The bridge retrieves 182 the LAN number from the configuration message and subsequently uses 184 the LAN number to forward messages in the same manner as if the LAN number had been manually configured. Periodically thereafter, the bridge receives 186 new configuration messages and performs the same procedure on them.

If a bridge is designated, it takes on additional responsibilities. First, a designated bridge is responsible for periodically sending LAN number configuration messages to the other bridges on its LAN (i.e., the LAN for which the designated bridge is designated). In addition, the designated bridge must interact with the root bridge to ensure that the LAN numbers are kept up-to-date and new LAN numbers are assigned properly. As described below, the bridge meets these responsibilities by requesting a LAN number from the root bridge when it becomes designated, and thereafter sending configuration messages to the other bridges on the LAN indicating the LAN number returned by the root bridge.

As shown in FIG. 5B, when a bridge becomes designated 190, it may or may not know the ID, port, and LAN number that were being used by the previous designated bridge for the LAN. The newly designated bridge may know these facts if the bridge was connected to the LAN before it became designated and thus was receiving configuration messages from the previously designated bridge—but the newly designated bridge may also have been down or disconnected just before it became designated. In the latter case, the newly designated bridge first attempts to learn the LAN number and other information by waiting 192 for a configuration message from the previously designated bridge for the LAN (if any).

As shown in FIG. 5C, when a bridge becomes 204 undesignated it does not immediately discontinue transmission of LAN number information in its configuration messages. Rather, it continues 206 transmitting this information in its configuration messages until a configuration message having new LAN number information is received from the new designated bridge on the LAN; only then does the previously designated bridge revert to the procedure illustrated in FIG. 5A. Thus, a newly designated bridge which does not know the LAN number can often learn it by waiting 192 for a period of time longer than the time between configuration messages. If there is a previously designated bridge, the previously designated bridge will transmit a configuration message which indicates the LAN number. Note, however, that there may not be a previously designated bridge for the LAN, e.g. if the LAN was not connected to the remainder of the network before the new bridge was connected. For this reason, the new bridge gives up after waiting 192 for a period longer than the time between configuration messages, and continues on to step 194.

Whether or not the newly-designated bridge has learned the previous LAN number and the ID of the previous designated bridge/port, the newly designated bridge will generate 194 a request message to the root bridge. This message can take the form of a multicast message addressed to an unused address, or it can use an unused message type. In either case, the message is transmitted toward the root bridge by transmitting it onto the LAN which is in the direction of the root bridge (the identity of this LAN will be known as a .result of the spanning tree algorithm). Bridges which receive these messages will forward them only if doing so moves the message in the direction of the root. In this way, the message is passed presently to the root where it can be processed.

The format of the LAN number request message is illustrated in FIG. 6B. The message indicates the ID 270 of the requesting bridge, the port 272 on the requesting bridge to which the LAN is connected, the ID 274 of the previous designated bridge for that LAN (if known), the port 276 on the previously designated bridge to which the LAN was connected, and the previous LAN number 278. The root bridge processes this information and assigns a new LAN number to the LAN, and transmits this new number (in a manner elaborated below) back to the newly designated bridge. After the newly designated bridge receives 196 the LAN number, it attaches 198 to its subsequent configuration messages the assigned LAN number, its own ID, and the number of the port to which the LAN is connected.

Once a designated bridge has been initialized as described above, it begins transmitting refresh messages to the root bridge. This is done by repeatedly waiting 200 for a refresh time and then sending 202 a refresh message to the root bridge. The format of the refresh message is illustrated in FIG. 6C: the message includes the ID 280 of the bridge transmitting the message, the port 282 to which the designated bridge's LAN is connected, and the LAN number 284 assigned to that LAN. As with the request messages, the refresh message can take the form of a multicast message addressed to an unused address, or it can use an unused message type. The message is initially transmitted by the refreshing bridge in the direction of the root bridge, and bridges which receive it forward it only if doing so moves the message in the direction of the root, thus delivering the message presently to the root bridge.

The root bridge has the most responsibilities. It must receive the requests from other designated bridges and assign LAN numbers, and also must receive and deal with refresh messages. The procedures for handling these matters are illustrated in FIGS. 5D, 5E, and 5F.

Figure 5D:
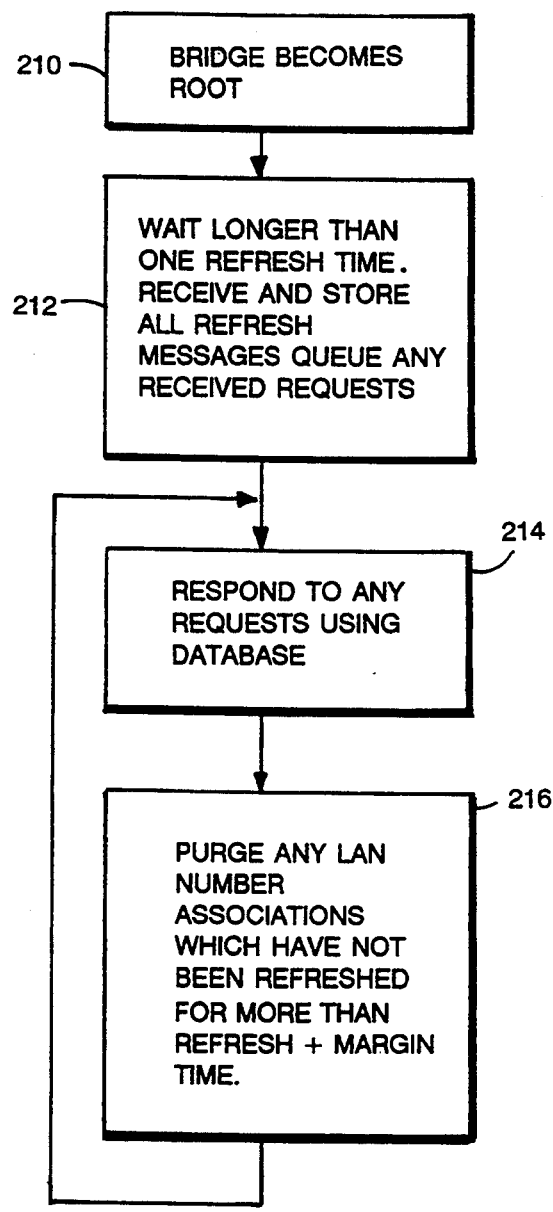
FIGS. 5D through 5F illustrate procedures followed by a root bridge as part of a scheme for automatically assigning LAN numbers.

FIG. 5D illustrates the procedure for initializing a new root bridge. As discussed above, when the root bridge is initializing, it does not contain a complete database of the LAN numbers in use in the network. For this reason, the new root bridge first waits 212 for a period longer than the refresh time (i.e., the time that designated bridges wait between refresh messages in step 200, FIG. 5B). During this period, the root bridge receives and stores refresh messages from each designated bridge on the network. Any requests for new LAN numbers received during this period are queued for later disposition. After the refresh time has expired, the root bridge responds 214 to any requests for LAN numbers using the procedure outlined in FIG. 5E.

Figure 5E:
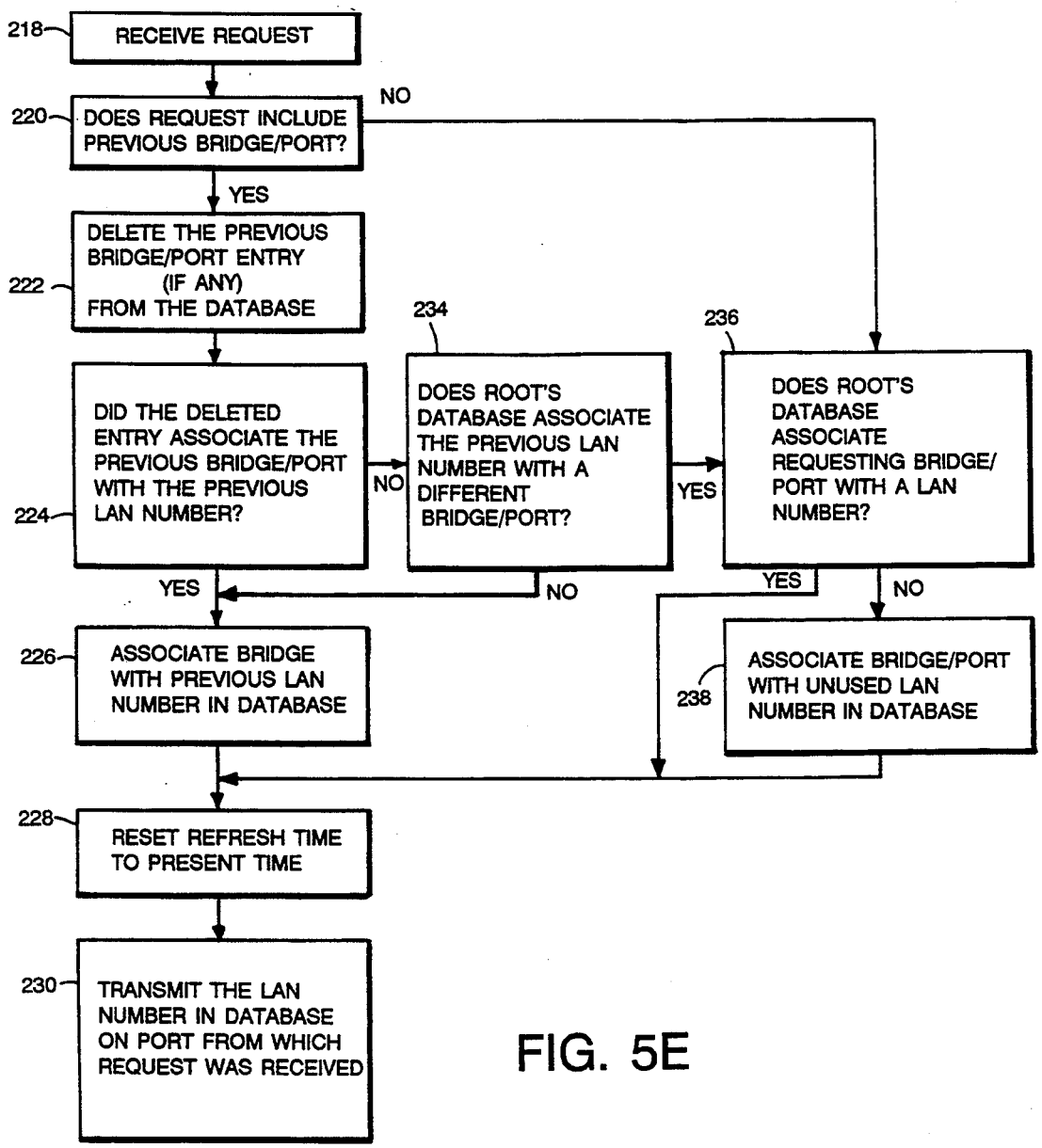
Figure 5F:
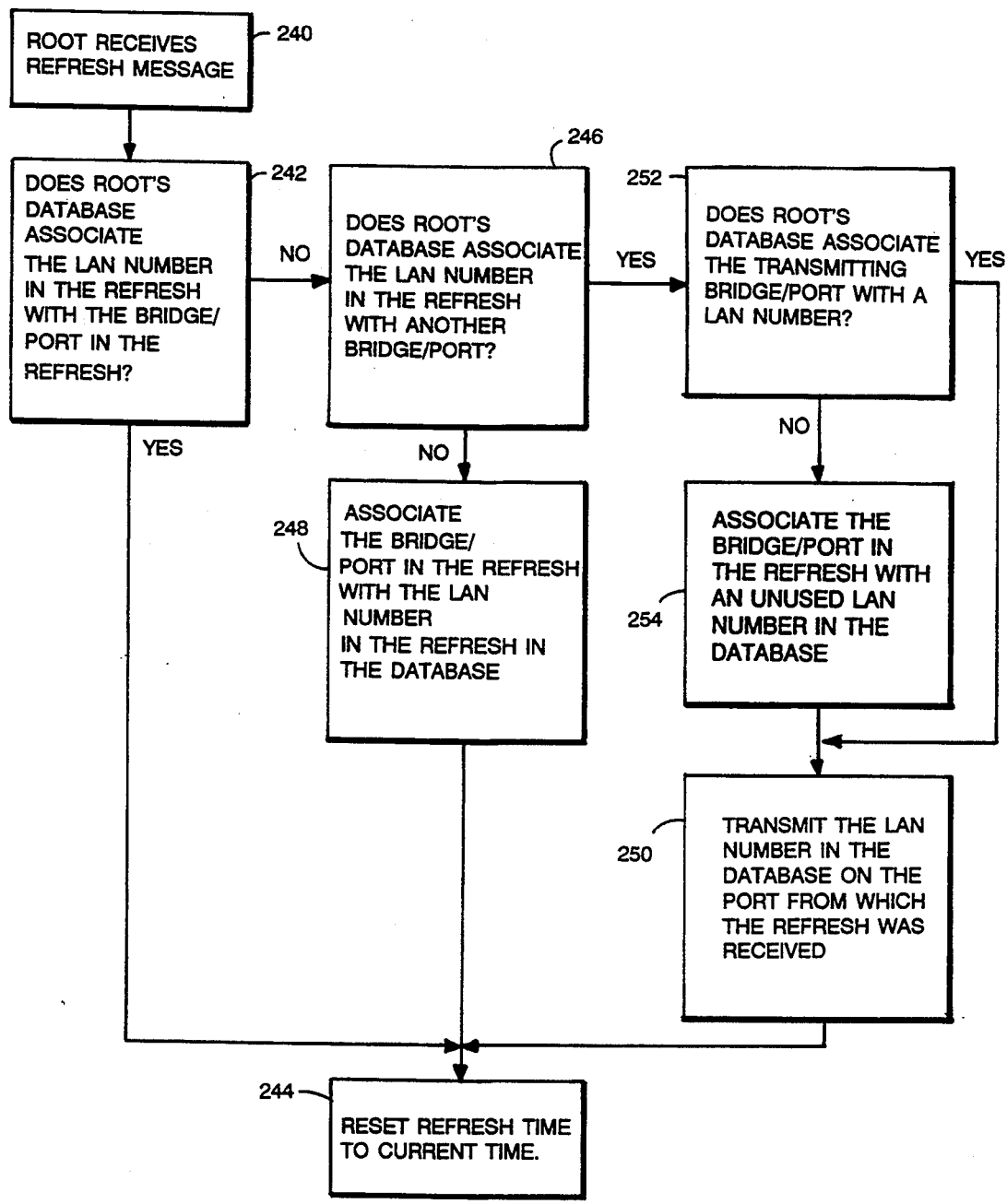

Once the root bridge is initialized, it continues to respond to requests for LAN numbers by the procedure of FIG. 5E, and also responds to refresh messages according to the procedure of FIG. 5F. To ensure that the LAN number database remains current, the root bridge also periodically determines 216 (FIG. 5D) whether any of the LAN numbers stored in the database have not been refreshed recently by inspecting the time stamps 266 in the database. If a LAN number stored in the database has not been refreshed for a period equal to the refresh time plus a margin time, the root assumes that this entry is no longer valid and purges it from the database, allowing the corresponding LAN number to be reassigned.

FIG. 5E illustrates the procedure followed by the root bridge when it receives a LAN number request. Generally, the root bridge attempts to assign the same LAN number to the LAN as that which was previously assigned to the LAN, to prevent changes of LAN numbers and the resulting re-calculation of routes through the LAN/bridge network. To this end, the root bridge first inspects the LAN number request to determine 220 if it identifies (in fields 274, 276, and 278, FIG. 6B) the bridge and port of the previously designated bridge for that LAN and the previous LAN number. If so, the root bridge deletes 222 the previous bridge/port entry from its database (if such an entry exists). Then, the root bridge determines 224 whether the deleted entry from the database was associated with the previous LAN number listed in the request—if so the requesting bridge and port (identified in fields 270, 272) are associated 226 with that LAN number. If, however, the root bridge determines that the deleted entry did not associate the previous bridge with the previous LAN number, the root bridge then determines 234 whether the database associates the previous LAN number with a different bridge/port. If the LAN number has not been associated with a different bridge/port, the root bridge assigns 226 the previous LAN number to the requesting bridge's LAN.

If the root bridge determines (step 220) that the request does not identify a previous bridge/port/LAN number, or if the root bridge determines (step 234) that the previous LAN number has already been assigned, the root bridge checks 236 if there is a LAN number in the database that is already associated with the requesting bridge and port—if so, this LAN number is used. If not, the root bridge proceeds to assign a new LAN number to the requesting bridge and port; an unused LAN number is selected and associated 238 with the requesting bridge and port.

The procedure of FIG. 5E minimizes changes of LAN numbers over time; if the designated bridge suggests a LAN number which is not in use, that number is used, and, if the database already associates the LAN with a LAN number, that LAN number is used. Thus, a new LAN number is selected only if neither the designated bridge nor the database already have a valid LAN number for the LAN.

Also, the procedure of FIG. 5E "prefers" the previous LAN number incorporated in a request over any previous LAN number stored in the database: the root bridge determines (step 234) whether the LAN number in the request is valid before it determines (step 236) whether the root's database contains a valid number. Thus, if the LAN number suggested by the requesting bridge is valid, that number is used, regardless of the number stored in the root's database. The reason for this preference is that the LAN number in the request was actually in use in the network at one time; therefore, it is probable that the LAN number in the request will be more current than any previous LAN number stored in the database. However, this may not be true in all cases; one may invert the preference where desireable (by reversing the order of steps 234 and 236) and use the LAN number in the database even when an otherwise valid LAN number is included in the request.

After a LAN number has been chosen for the requesting bridge, and an appropriate entry created (if necessary) in the root bridge database, the root bridge resets 228 the refresh time for the new entry to the present time, and transmits 230 the newly-assigned LAN number back to the requesting bridge. The transmission is accomplished by forwarding a special LAN number assignment message incorporating the LAN number onto the port of the root bridge from which the request was received. This special message can take any of the forms described above; it can be an appendix to the configuration messages, it can be a new message type, or it can be a multicast message addressed to an unused multicast address. In each case the message is forwarded through that portion of the spanning tree leading from the port selected by the root bridge, eventually reaching the requesting bridge.

FIG. 5F illustrates the procedure by which the root bridge deals with LAN number refresh messages from other designated bridges. After receiving 240 the refresh message, the root bridge determines 242 whether its database associates the LAN number listed in the refresh message (field 284, FIG. 6C) with the bridge and port listed in the refresh message (fields 280 and 282, FIG. 6C). If so, the root bridge resets 244 the refresh time in the corresponding entry to the current time.

However, if the refresh message and the database do not correspond, the root bridge then determines 246 whether the LAN number in the refresh message is associated with another bridge and port. If not, the root bridge updates its database by associating the bridge and port listed in the message with the LAN number indicated in the message, and then resets 244 the refresh time in the entry to the current time.

If, on the other hand, the database already associates the LAN number in the refresh with another bridge and port, the root bridge must assign a new LAN number to the refreshing bridge. To do this, the root bridge determines 252 whether the database already associates the refreshing bridge and port with a LAN number. If so, this number is used, and a LAN number assignment message is transmitted 250 back to the refreshing bridge via the port from which the refresh message was received. Otherwise, an unused LAN number is associated 254 with the refreshing bridge and port and this number is transmitted 250 back to the refreshing bridge. After the transmission 250, the refresh time in the associated entry is reset 244 to the present time.

As with the procedure of FIG. 5E, the procedure of FIG. 5F minimizes changes of LAN numbers over time by using (where possible) the LAN number in the request or, failing that, the root's database. Also, the procedure of FIG. 5F "prefers" the previous LAN number incorporated in a refresh over any previous LAN number stored in the database; this preference is embodied in the ordering of steps 246 and 252, which are similar to steps 234 and 236 of FIG. 5E. However, the order of steps 246 and 252 may be reversed if it is desireable to invert this preference.

The LAN number assignment scheme described above can also be made reverse compatible, that is, compatible with preexisting bridges, by a few modifications. First, new bridges which implement the above algorithms are designed to include a "manual mode" in which the automatic LAN number assignment routines are disabled and the LAN number can be set manually as in preexisting bridges. Since preexisting bridges will not transmit the required LAN number assignment information, if one of the bridges on a LAN is a preexisting bridge, the remainder of the bridges must be placed in manual mode and use manually configured LAN numbers. LANs which do not have any preexisting bridges operate in automatic mode and have their LAN numbers set in the manner described above.

To prevent conflicts between the manually assigned LAN numbers and the automatically assigned numbers, a section of the LAN number space is reserved for manual configuration; i.e., the new bridges are forbidden from assigning LAN numbers in a given subset of the LAN number space. Then, the manually configured LANs can safely be assigned LAN numbers within the forbidden space.

To ensure that the preexisting bridges properly transmit the LAN number request and assignment messages as well as the LAN number refresh messages, these messages are formatted as multicast messages addressed to an unused multicast address; thus the preexisting bridges will forward the messages along the spanning tree and thereby transmit them to their intended destinations.

The root bridge must be one of the new bridges so that it can perform the routines of FIGS. 5D, 5E and 5F; therefore, the root priorities of the new bridges are set higher than the root priorities of the preexisting bridges, thereby ensuring that if there is any new bridge in the network it will be elected as the root bridge.

The configuration of parallel bridge numbers poses similar problems to the configuration of LAN numbers. As with LAN numbers, there is no simple method for verifying that the parallel bridge numbers have been configured correctly; verification typically involves (as with LAN numbers) tracing the connections at the back of each bridge device, an arduous task. Furthermore, the consequences of misconfiguration are fairly severe: if the same parallel bridge number is used twice, each packet sent through that bridge number will be duplicated, causing (in the best case) excess transmission overhead or (in the worst case) end system crashes. In addition, since a misconfiguration can occur in many different locations in a network, once misconfiguration errors are recognized, locating the misconfiguration can involve checking and/or re-configuring most of the network. Thus, when a large network has been misconfigured, it can be difficult to locate and correct the problem.

The task of assigning parallel bridge numbers, even when performed correctly, can be arduous. The number of parallel bridge numbers tends to expand geometrically with the number of LANs (since the number of possible LAN connections increases geometrically with the number of LANs), and thus can become a fatal burden to administering a moderate-to-large sized network. The burden is even further enhanced by the presence of 3+-port bridges (e.g., bridge 114 of FIG. 1), particularly when using a bridge such as that described above, i.e., a 3+-port bridge which assigns different parallel bridge numbers for each connection made by the bridge. As discussed above, the number of parallel bridge numbers required by an n-port bridge of this type grows as $O(n^2)$, and thus can be prohibitively large for even a modest number of ports.

As illustrated in FIGS. 7A–8B, it is possible to avoid the problems associated with parallel bridge number misconfiguration by designing the bridges to automatically assign the parallel bridge numbers. Generally, the bridge numbers for bridges on a LAN are assigned by the designated bridges, taking care to eliminate conflicts and minimize changes.

Figure 7A:
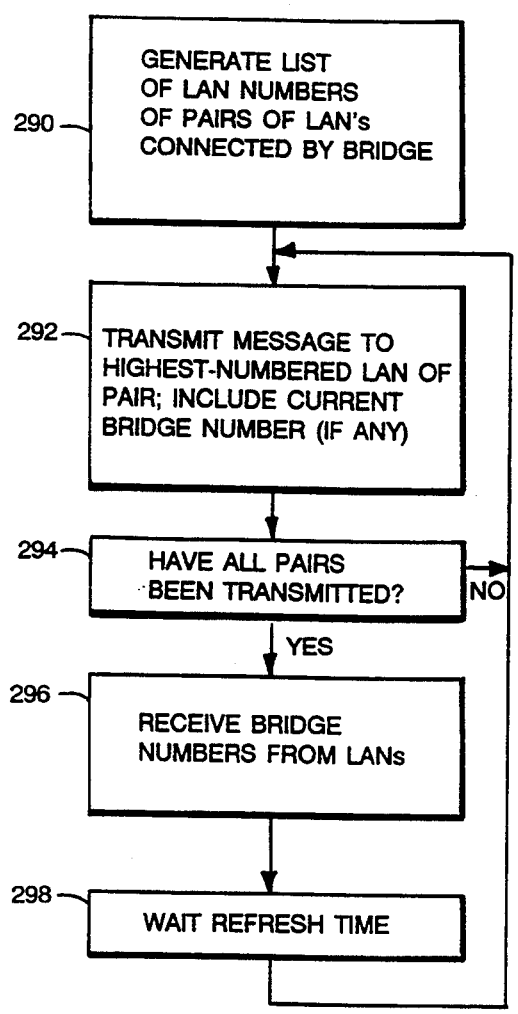
FIGS. 7A and 7B illustrate procedures followed by a bridge as part of a scheme to automatically assign parallel bridge numbers.

Referring to FIG. 7A, to initialize a bridge at start-up or after a new connection has been made, the bridge generates 290 a list of the LAN numbers of each pair of LANs that it connects. For a two-port bridge this list can be easily constructed; it has only one item identifying the LAN numbers of the two LANs connected by the two-port bridge. For an n-port bridge generating the list is a bit more elaborate, as discussed below in connection with FIG. 7B.

Once the list of pairs is generated, the bridge generates "bridge number" messages, one for each pair, which request a parallel bridge number from the designated bridge. The format of a bridge number message is generally illustrated in FIG. 8A. The message includes the unique factory-assigned ID of the bridge (350), the LAN number of one of the LANs to which the bridge connects (352), and, in addition, a field 354 indicating the bridge number (if any) that was previously assigned to the bridge—for use in subsequent "refreshes" of the parallel bridge number to the designated bridge. Where, as in this case, there is no prior parallel bridge number because the bridge is initializing, a special value "*" is placed in field 354 to indicate that there is no prior bridge number, and the message is treated as a request rather than a refresh, as elaborated below.

The bridge number message may be a multicast message addressed to an unused address, it may use an unused message type, or it may be an appendix to the configuration messages that are periodically transmitted by the bridges as part of the spanning tree algorithm.

When generating a parallel bridge number request message for one of the pairs of LANs connected by a bridge, the bridge incorporates, in field 352 of the message, the LAN number of one of the two LANs identified by the pair, and then transmits 292 the message to the other LAN identified in the pair. The designated bridge on the LAN on which the message is transmitted then receives the message, assigns a parallel bridge number, and returns the bridge number in a response message.

To prevent conflicting assignments, each bridge uses the same, consistent selection method to determine which LAN is identified in the message and, conversely, which LAN receives the request message. One suitable selection method is to send the message to the LAN with the numerically higher LAN number. If every bridge uses this technique, every bridge connected between a given pair of LANs will send its requests to the same one of the two LANs, and the designated bridge on that LAN will then be able to assign parallel bridge numbers to all of the bridges.

As indicated above, parallel bridge number messages are generated and transmitted 292 to one of each pair of LANs connected by the bridge, until the bridge determines 294 that all pairs have been transmitted. Then, the bridge begins receiving 296 bridge numbers from the designated bridges on the various attached LANs, and begins using the assigned numbers for transmitting packets.

As discussed below, each designated bridge maintains a database of all of the parallel bridge numbers that it assigns, to ensure that future numbers are assigned consistently. It is critical that this database be protected from loss, either due to a failure in the designated bridges or a topological change that causes a different bridge to become designated. To accomplish this, a refresh mechanism is employed. After the bridges are initialized, they wait 298 a refresh time and then return to step 292 and re-commence transmission of bridge number packets of the type illustrated in FIG. 8A. However, unlike the initialization period, during the refresh period the bridge number packets contain the current bridge number in field 354. This information can then be used by the designated bridge to recover the database and/or verify that the database is accurate.

Figure 7B:
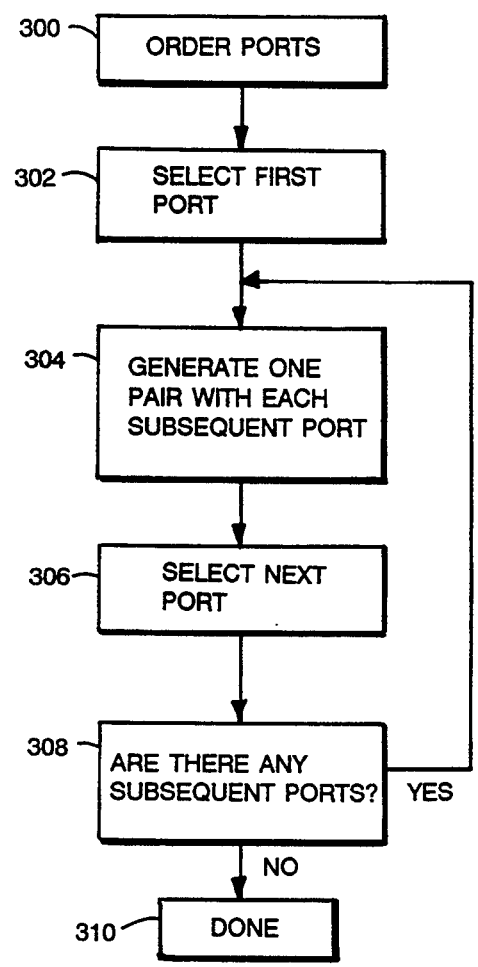

The procedure for generating a list of all of the pairs of LANs connected by a 3+-port bridge is illustrated in FIG. 7B. First, the ports on the bridge are ordered 300, e.g. by sorting according the port numbers or by sorting according to the LAN numbers of the LANs connected to those ports. Then, the first port in the order is selected 302 and one pair is generated 304 for each subsequent port in the order, each pair including the first port and the subsequent port. (For an n-port bridge this first step generates n−1 pairs.) Then the next port is selected 306 and the process is repeated. (Generating n−2 pairs.) The process is re-repeated for each subsequent port until (308) the last port in the order is reached, at which point all of the possible pairs have been generated. Thus, the total number of pairs for an n-port bridge is:

$$n-1+n-2+n-3+\ldots+1,$$

which equals, as indicated above, n(n−1)/2.

As mentioned above, the designated bridge assigns the bridge numbers by reference to a stored database. This database is illustrated in FIG. 8B, and the procedures for initializing the database and using the database to respond to bridge number messages are illustrated in FIGS. 7C and 7D.

Referring to FIG. 8B, each entry in the database associates a bridge attached to the designated bridge's LAN (identified by the factory-set ID stored in field 360) with the LAN number of the LAN that the bridge connects to (field 362), and the parallel bridge number that is assigned to the bridge (field 364).

Figure 7C:
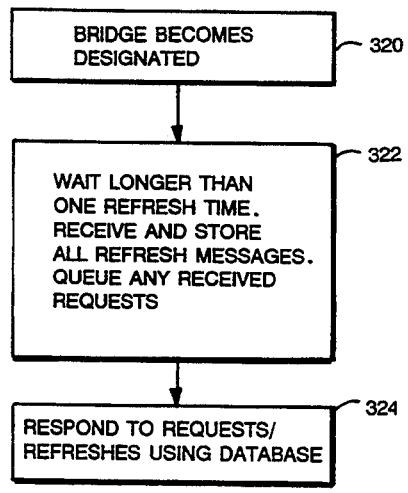
FIGS. 7C and 7D illustrated procedures followed by a designated bridge as part of a scheme to automatically assign parallel bridge numbers.

As illustrated in FIG. 7C, when a bridge becomes designated 320, it first waits 322 for longer than one refresh time and stores all received refresh messages during that period, thereby effectively initializing its database. During this period, any request messages (recognized by a "*" value in field 354 (FIG. 8A)) are queued for later processing. Refresh messages are stored in the database by creating an entry listing the bridge ID, LAN number, and bridge number from the refresh message (fields 350, 352, and 354) in the fields 360, 362, and 364 of a new entry. After the initialization period expires, the designated bridge responds 324 to the queued requests, and to subsequent requests and refreshes, using the database as described below.

Figure 7D:
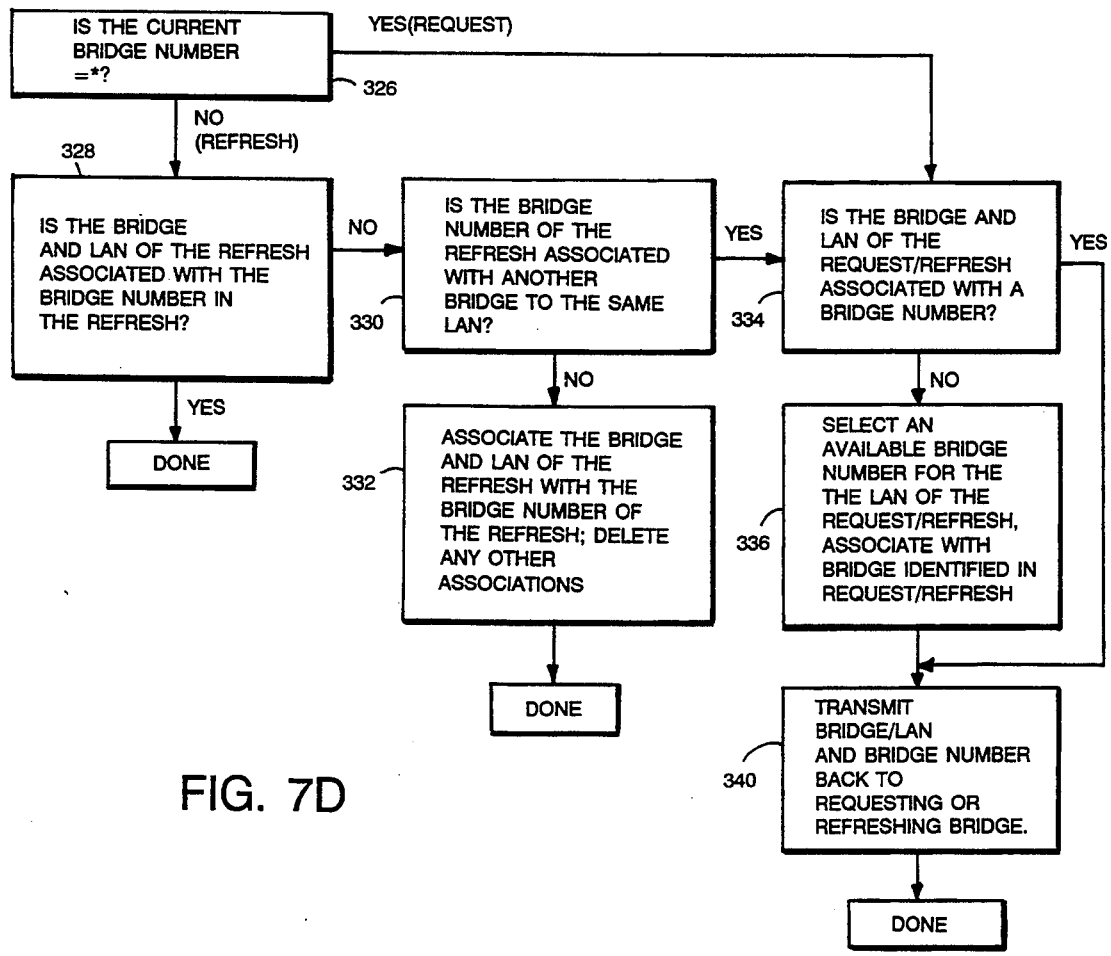

Referring to FIG. 7D, after initialization, when the designated bridge receives a bridge number message, it first determines 326 if the message is a request for a new bridge number or a refresh of a previously assigned number by checking if field 354 (FIG. 8A) is "*".

If field 354 contains a parallel bridge number (not "*"), the message is a refresh of a previously-assigned number, and the designated bridge then proceeds to determine 328 whether the bridge number identified by the message is the same as the bridge number in the database which is associated with the bridge ID and LAN number identified by the message. If so, the database is consistent with the refresh, and no further action is taken. However, if the database is not consistent with the refresh, the designated bridge determines whether the bridge number in the refresh has been assigned to another bridge; that is, the designated bridge searches for an entry in the database having the LAN number and bridge number identified by the refresh. If no such entry is found, the bridge number identified by the refresh has not been assigned, and the designated bridge proceeds to assign the number to the refreshing bridge by creating 332 an entry in the database containing each of the fields in the refresh, and deleting any other entries which identify the bridge and LAN number in the refresh.

If the received message is a refresh, but it is inconsistent with the database and identifies an unacceptable parallel bridge number, or if the received message is a request for a parallel bridge number (i.e., if in step 326 field 354 contains "*"), the designated bridge must select a new parallel bridge number to transmit to the refreshing/requesting bridge. To do this, the designated bridge first determines 334 whether there is a previous parallel bridge number stored in the database associated with the refreshing or requesting bridge (i.e., having the bridge ID and LAN numbers identified in the request). If there is such an entry, the bridge number from the entry is incorporated in a response (along with the bridge ID and LAN number of the request), and the response is transmitted 340 back to the requesting bridge. However, if there is no such entry, then the designated bridge selects an available parallel bridge number and associates it with the requesting bridge. To select an available parallel bridge number, the designated bridge collects all of the entries in the database which identify the LAN number indicated in the request (these entries identify all of the bridges which parallel the requesting or refreshing bridge), and finds a parallel bridge number which is does not appear in any entry. Once a suitable number is selected, the designated bridge transmits 340 the selected number back to the requesting bridge.

The procedure of FIG. 7D minimizes changes of parallel bridge numbers over time; if the parallel bridge number suggested by a refreshing bridge is not already in use, that number is used, and, if the database associates a refreshing or requesting bridge with a bridge number, that number is used. Thus, a new parallel bridge number is selected only if neither the bridge nor the database has a valid parallel bridge number for the bridge.

Also, the procedure of FIG. 7D "prefers" the previous parallel bridge number incorporated in a refresh over any previous parallel bridge number stored in the database: the designated bridge determines (step 330) whether the bridge number in the refresh is valid before it determines (step 334) whether the database contains a valid number. Thus, if the parallel bridge number suggested by a refreshing bridge is valid, that number is used, regardless of whether a valid number stored in the designated bridge's database. The reason for this preference is that the parallel bridge number in the refresh is actually in use in the network; therefore, it is probable that the parallel bridge number in the refresh will be more current than any parallel bridge number stored in the database. However, this may not be true in all cases; one may invert the preference where desireable (by reversing the order of steps 330 and 334) and use the parallel bridge number in the database even when an otherwise valid parallel bridge number is included in the refresh.

One advantage of the above scheme is that it resolves several difficulties of the technique, referred to above, of assigning independent parallel bridge numbers to each pair of ports on a 3+-port bridge. One major difficulty with this technique is the sheer time and effort involved in configuring different numbers for each of the various ports. While the above scheme does not reduce the quantity of configuration to be performed, it does allow the multiple parallel bridge numbers to be configured automatically, thus eliminating the human effort.

A further difficulty with 3+-port bridges is the possibility that two or more of the ports of the bridge will be connected to the same LAN. Typically, such a connection is treated as a misconfiguration, and is neither detected nor accounted for in routing messages through the network. One result of this treatment is that, in a typical network, if two ports of a 3+-port bridge are connected to the same LAN, every packet forwarded through the bridge from that LAN will be duplicated. This result is objectionable not only because it creates excess network traffic and may cause end system failures, but also because it may in some cases be desirable to connect two ports of a 3+-port bridge to a single LAN to allow for greater traffic volume to and from that LAN. But with the typical treatment described above, such a connection cannot be made.

The scheme for automatic assignment of parallel bridge numbers described above can be used to improve this situation, allowing two or more ports attached to the same LAN to be assigned different parallel bridge numbers, thus allowing the network to treat the two ports as if they were two physically separate bridges and route messages through the ports in a parallel fashion. The changes necessary to support this result are straightforward; the bridge ID fields 350 (in the bridge number messages, FIG. 8A) and 360 (in the designated bridge database, FIG. 8B) are replaced with "bridge and port" fields. The bridge and port fields store a concatenation of the originating bridge's ID and the number of the port on that bridge that connects the bridge to the LAN on which the message is transmitted. Thus, if two or more ports of a bridge are connected to the same LAN, each port is treated by the process of FIGS. 7A-7D as if it were a physically separate bridge connected to each of the other LANs. As a result, each port will be assigned a separate parallel bridge number, and messages can subsequently be routed through the 3+-port bridge via either port.

While the above approach provides complete flexibility, it also increases storage requirements which may not be justified by the added flexibility. If this is the case, it may be desirable to apply the less flexible scheme illustrated in FIG. 9A. Under this scheme, each 3+-port bridge determines whether two of its ports are connected to the same LAN, and if so, the 3+-port bridge takes the appropriate corrective action to prevent duplication. To detect multiple connections, the 3+-port bridge periodically attempts to transmit messages from one of its ports to another of its ports. This is done by selecting 370 each port and transmitting 372, through the selected port, messages addressed to the data link addresses of each other port. After a short period of time 373, if 374 any of these messages are received at any of the other ports, then there are two ports connected to the same LAN and corrective action is taken 376. This process is repeated for each port until 378 all ports are done.

Various types of corrective action may be taken. Referring to FIG. 9B, one option is to disable 380 all of the ports which received the message and the port which transmitted it, thereby cutting off all communications with the multiply-connected LAN. At the same time, a warning is sent to system management that the network is misconfigured, through an audible or visual indication on the bridge itself and/or in the form of message. Referring to FIG. 9C, another option is to arbitrarily choose 382 one of the multiply-connected ports, and disable the operation of all of the other ports as long as the chosen port remains operative. Thus, the additional ports are placed on "standby" unless and until the chosen port fails. A port can be chosen by any unambiguous method; for example, the port with the highest capacity, or numerically highest number, can be chosen.

While the above will detect multiple connections to a LAN in most circumstances, it is possible that multiple connections may go unnoticed if two or more ports have failed, for example, if neither is able to send messages. These situations can be detected, in the case of token ring LANs (in which each message is circulated once around a LAN over a brief period of time), as illustrated in FIG. 9D. Periodically, each port is selected 390 and a message is transmitted 392 via the token ring from the selected port to the datalink address of the selected port. After a short wait 393, if the message has not been received 394 by the port, there is either a break in the token ring or a fault in the port. In either case, the port is disabled 396 and a warning is sent to system management. When 398 all ports have been checked, the procedure is complete.

As discussed above with reference to FIG. 2, the conventional method for finding routes through a LAN/bridge network uses "all paths explorer" messages, which proliferate exponentially through the LAN/bridge network. While this scheme will find the optimum route, the computational expense of finding the route can be prohibitive. An alternative scheme which does not involve exponentially proliferating messages is described below.

Under this scheme, the bridges perform a routing protocol that provides each bridge with sufficient information to compute a route to any LAN in the network. There are several protocols which would be suitable for this purpose; for example the OSI Intermediate System to Intermediate System protocol, which is documented in ISO Internation Standard 10589, available from BSi Standards, 2 Park Street, London W1A 2BS, England, and incorporated herein by reference.

Referring to FIG. 10A, under a routing protocol similar to ISO 10589, each of the bridges in the network is designed to periodically transmit a "routing message" to each other bridge on the network. As shown in FIG. 10B, the routing message may include the factory-set ID for the bridge 410 as well as a sequence of fields 412, 414 which identify the LAN numbers of each respective LAN connected to the originating bridge and identify the "cost" (computational expense) of forwarding messages from the originating bridge onto each respective LAN.

Each bridge generates 400 a routing message and transmits it to one connected LAN. Thereafter, each routing message is forwarded throughout the network so that each bridge receives 404 copies of the routing messages originated by every other bridge. One way to achieve this is to "flood" each message throughout the network; i.e., transmit multiple copies of the message through every connection in the network by a technique similar to that used by explorer packets. A more complex, but more efficient way to achieve the same result is to forward 402 the message through the spanning tree of the network via the designated bridges. Using the information in the routing messages, each bridge in the network can compute optimal routes from any LAN in the network to any other LAN in the network.

As with the other special messages discussed above, the routing messages may be multicast messages addressed to an unused multicast address (an implementation which facilitates transmission through the network spanning tree), may use an unrecognized message type, or may be transmitted as an appendix to the existing spanning tree configuration messages.

Because each bridge can compute optimal routes from each LAN to each other LAN, it is no longer necessary to exponentially propagate all paths explorer messages through the network; the computation of optimal routes can be used as a substitute for the explorer procedure. As shown in FIG. 10C, when an end system on a LAN attempts to find a route to another end system, it generates 420 an all-paths explorer packet and transmits it onto the LAN. Under the procedure described in FIG. 2, this packet would be copied to each attached LAN, and from there onto subsequent LANs, proliferating exponentially throughout the network. Under the present scheme, however, the bridges do not forward the all-paths explorer packets.

Before taking any action on an all-paths explorer packet, the bridges on the originating LAN verify that the message was in fact originated on the LAN from which it was received, by determining whether the route field of the message is empty. If the route field of the message is not empty, the message was not originated on the LAN from which it was received, and it is discarded (for reasons that will be clarified below).

After verifying that the received message has an empty route field, the bridges convert 422 the message to a special "explorer broadcast" message and forward this message throughout the network. The format of the explorer broadcast message is illustrated in FIG. 10D; the message contains the factory-set ID for the source end system 430, the LAN number of the LAN on which the source end system transmitted the original explorer message, and the factory-set ID for the desired destination end system 434. The explorer broadcast messages may be favorably implemented as multicast messages addressed to an unused multicast address, or alternatively may use an unrecognized message type, or may be transmitted as an appendix to the periodically transmitted spanning tree configuration messages (if the resulting delays are acceptable).

One or more copies of the explorer broadcast message is forwarded to each LAN in the network. This may be accomplished by a "flood" mechanism similar to that used for the all-paths explorer messages (i.e., each bridge copies the message to every LAN to which it is connected, except the LAN from which the explorer broadcast message was received; a lifetime or maximum hop count is used to kill off broadcast messages in loops). Alternatively, a procedure similar to that used for multicast messages may be used, in which the designated bridges create and forward the explorer broadcast messages throughout the network spanning tree.

After a bridge has received 424 one or more copies of the explorer broadcast message, the bridge computes the optimal routes from each LAN connected to the bridge to the source LAN indicated by field 432 of the message. Then, the bridge examines these routes and determines whether the bridge is on any one of these optimal routes (that is, the bridge determines whether a computed optimal route passes through the bridge itself). If so, the bridge converts the spanning tree broadcast message into a counterfeit all paths explorer message. This is done by creating an all-paths explorer message identical to that which was received from the originating end system is step 422, and then appending to the route field of the all paths explorer message the optimal route that was computed by the bridge. This counterfeit all paths explorer message is then transmitted 426 to the LAN which is the end point of the optimal route.

If the destination end system identified in the counterfeit all paths explorer message is on the LAN to which the counterfeit all paths explorer message was forwarded, the destination end system will receive 428 the message and treat it as if it were a genuine all paths explorer message transmitted through the network in the ordinary fashion. The destination end system will then (after waiting briefly for the arrival of any other all paths explorer messages) send a response back to the source end system in the standard manner and transmission will be initiated.

Because the bridges will ignore all paths explorer messages which do not have an empty route field, a counterfeit all paths explorer message will only be transmitted on the one LAN for which it was specifically created.

Also, under the technique described above, only one counterfeit all paths explorer message will be transmitted to each LAN; each bridge on a given LAN will compute the same optimal route to the given LAN, and this path will pass through only one bridge on the given LAN. Thus, only one bridge on the given LAN will determine that it is on the optimal route to the given LAN, and only that one bridge will create a counterfeit all paths explorer message and forward it to the LAN.

As can be seen from the last two observations, the scheme of FIGS. 10A–10D allows location of optimal routes without exponential proliferation of explorer messages. In fact, each LAN will receive only one explorer message encapsulating the single optimal route from that LAN to the source end system. Thus, this scheme substantially reduces the communications overhead involved with all paths explorers.

Less optimal alternatives, which still have significant advantages over the all paths explorer technique, are also possible. For example, it may be preferable to design the bridges such that, in response to an explorer broadcast, a bridge sends a counterfeit all-paths explorer message to every LAN except the LAN from which the explorer broadcast message was received, regardless of whether the optimal route to that LAN passes through the bridge. Although this procedure is less optimal because it may cause the end system to receive multiple counterfeit all-paths explorer messages, it will simplify the computations to be made by the bridges, and since each of these counterfeit explorer messages will identify the same route (assuming the routing protocol is operating correctly), and the end system can simply choose one message and discard the remainder. Furthermore, this alternative procedure may be more robust in the face of failures in the routing protocol. For example, if the bridges do not agree on the optimal routes through the network, it is possible for every bridge on a LAN to believe that another bridge in on the optimal route to the LAN. As a result, under the first procedure described, none of the bridges would transmit a counterfeit all paths explorer; however, under the alternative procedure, in these circumstances each bridge would transmit a counterfeit all paths explorer, and the end system would therefore be able to determine a route.

Other embodiments are within the following claims.

What is claimed is:

1. A method of determining, in a network comprised of LANs and bridges interconnecting said LANs, wherein the bridge associate the LANs with LAN numbers, that a first and a second bridge connected to a given one of said LANs have not been configured to associate said given LAN with matching LAN numbers, comprising encoding a first LAN number associated with said given LAN at said first bridge into a LAN number verification message, transmitting said LAN number verification message to said second bridge, comparing said first LAN number encoded in the received LAN number verification message to a second LAN number configured for said given LAN at said second bridge, and if said first and second LAN numbers do not match in said comparing step, determining that said first and second bridges have not been configured to associate said given LAN with matching LAN numbers.

2. The method of claim 1 further comprising
   if said first and second LAN numbers do not match in said comparing step, reporting a mismatch by transmitting a message.

3. The method of claim 1 further comprising
   if said first and second LAN numbers to not match in said comparing step, reporting a mismatch by a visual or audible signal.

4. The method of claim 1 wherein
   said LAN number verification message is addressed to a multicast address which is not being used by end systems on said given LAN.

5. The method of claim 1 wherein said LAN number verification message is a modified version of a configuration message used by said bridges to generate a spanning tree for said network.

6. A bridge for connection to two LANs comprising
   storage for associating the LANs connected to said bridge with LAN numbers,
   an encoder for encoding a LAN number associated with a given one of said LANs connected to said bridge into a LAN number verification message, and
   a transmitter for transmitting said LAN number verification message onto said given LAN.

7. The bridge of claim 6 further comprising
   a receiver for receiving LAN number verification messages, and
   a comparer for comparing the LAN number encoded in the received LAN number verification message to the LAN number configured for said LAN at said bridge.

* * * * *